(12) United States Patent
Kawashima

(10) Patent No.: US 11,536,280 B2
(45) Date of Patent: Dec. 27, 2022

(54) VACUUM PUMP, MAGNETIC BEARING DEVICE, AND ROTOR

(71) Applicant: Edwards Japan Limited, Yachiyo (JP)

(72) Inventor: Toshiaki Kawashima, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 374 days.

(21) Appl. No.: 16/604,936

(22) PCT Filed: Apr. 11, 2018

(86) PCT No.: PCT/JP2018/015285
§ 371 (c)(1),
(2) Date: Oct. 11, 2019

(87) PCT Pub. No.: WO2018/193944
PCT Pub. Date: Oct. 25, 2018

(65) Prior Publication Data
US 2020/0158118 A1    May 21, 2020

(30) Foreign Application Priority Data

Apr. 20, 2017   (JP) ............................. JP2017-083964

(51) Int. Cl.
*F04D 19/04* (2006.01)
*F04D 29/058* (2006.01)
*F16C 32/04* (2006.01)

(52) U.S. Cl.
CPC .......... *F04D 19/048* (2013.01); *F04D 29/058* (2013.01); *F16C 32/0489* (2013.01);
(Continued)

(58) Field of Classification Search
CPC .............. F16C 32/0489; F16C 32/0446; F16C 2360/45; F16C 32/0408; F16C 32/044; F04D 19/042
See application file for complete search history.

(56) References Cited

U.S. PATENT DOCUMENTS

| 4,579,508 A | 4/1986 | Tsumaki et al. |
| 4,609,332 A | 9/1986 | Masahura et al. |
| (Continued) | | |

FOREIGN PATENT DOCUMENTS

| CN | 102242721 A | 11/2011 |
| CN | 103069173 A | 4/2013 |
| (Continued) | | |

OTHER PUBLICATIONS

JP2010216458—English translation (Year: 2021).*
(Continued)

*Primary Examiner* — Tulsidas C Patel
*Assistant Examiner* — Viswanathan Subramanian
(74) *Attorney, Agent, or Firm* — Shumaker & Sieffert, P.A.

(57) ABSTRACT

Provided are a vacuum pump, a magnetic bearing device, and a rotor that suppress swinging and vibration of a rotor. A vacuum pump includes, in the following order in the exhaust direction of a gas, the center of gravity of a rotor, an active radial bearing that supports the rotor in the radial direction in a non-contact manner by using a magnetic force, and a passive radial bearing that supports the rotor in the radial direction in a non-contact manner using a magnetic force.

9 Claims, 6 Drawing Sheets

(52) U.S. Cl.
CPC ..... *F05B 2240/511* (2013.01); *F05B 2260/96* (2013.01); *F16C 32/0446* (2013.01); *F16C 2360/45* (2013.01)

(56) References Cited

U.S. PATENT DOCUMENTS

| | | |
|---|---|---|
| 2013/0129482 A1 | 5/2013 | Tsutsui |
| 2014/0212312 A1 | 7/2014 | Kozaki et al. |
| 2019/0024667 A1 | 1/2019 | Kawashima |

FOREIGN PATENT DOCUMENTS

| | | |
|---|---|---|
| CN | 104895808 A | 9/2015 |
| DE | 102013206526 A1 | 10/2014 |
| JP | H0646036 B2 | 6/1994 |
| JP | H0710492 U | 2/1995 |
| JP | 2002286036 A | 10/2002 |
| JP | 2010216458 A | 9/2010 |
| JP | 2016145555 A | 8/2016 |
| JP | 2017020520 A | 1/2017 |
| WO | 2017006844 A1 | 1/2017 |

OTHER PUBLICATIONS

JP2016145555A—English translation (Year: 2021).*
WO2017006844A1—English translation (Year: 2021).*
Extended Search Report from counterpart European Application No. 18787569.5, dated Nov. 19, 2020, 8 pp.
Translation and Original International Search Report and Written Opinion dated Jul. 3, 2018 in counterpart International Application No. PCT/JP2018/015285, 8 pp.

* cited by examiner

VACUUM PUMP, MAGNETIC BEARING DEVICE, AND ROTOR

This application is a U.S. national phase application under 37 U.S.C. § 371 of international application number PCT/JP2018/015285 filed on Apr. 11, 2018, which claims the benefit of priority to JP application number 2017-083964 filed Apr. 20, 2017. The entire contents of each of international application number PCT/JP2018/015285 and JP application number 2017-083964 are incorporated herein by reference.

TECHNICAL FIELD

The present disclosure relates to a vacuum pump, and a magnetic bearing device and a rotor used in the vacuum pump. Particularly, the present disclosure relates to a vacuum pump, a magnetic bearing device, and a rotor that suppress swinging and vibration of a rotor.

BACKGROUND

Semiconductor manufacturing apparatuses, liquid crystal manufacturing apparatuses, electron microscopes, surface analyzers, microfabrication apparatuses and the like have been known as the devices that perform exhaust processing using a vacuum pump to keep the inside vacuum. In a vacuum pump used in any of these devices, rotation of the rotor blades relative to the stator blades causes exhaustion of the gas of the device to the outside, to keep the inside of the device vacuum.

Japanese Patent Application Publication No. S59-83828 discloses a vacuum pump with a magnetic bearing that actively controls and restrains 3 degrees of freedom out of 5 degrees of freedom of the rotor and passively restrains the remaining 2 degrees of freedom. This type of vacuum pump is provided with a displacement sensor that measures displacement of an upper portion of the rotor from the equilibrium point in a radial direction, an active radial bearing that pulls the rotor back to the equilibrium point on the basis of the measured value of the displacement sensor, and a passive radial bearing that supports the rotor in the radial direction. The active radial bearing and the passive radial bearing are arranged on opposite sides of the center of gravity of the rotor in a gas exhaust direction.

SUMMARY

In the vacuum pump described above, in a case where the rotor is displaced from the equilibrium point in the radial direction, and once the active radial bearing applies an upper restoring force to the upper portion of the rotor, a lower restoring force, which acts on the lower side of the rotor due to the magnetic resistance that is applied to an armature disc of the rotor by the passive radial bearing, is offset by an inclination force according to the position of the rotor. For this reason, the foregoing vacuum pump has a problem in which swinging and vibration of the rotor at the resonance point of the bearings cannot be attenuated easily.

Furthermore, when the restoring force acting on the lower portion of the rotor is reduced, the rotor needs to be produced with high precision in order to improve the balance in the rotation of the rotor, bringing about another problem in which fine adjustment in assembling the vacuum pump requires a lot of time.

The present disclosure was contrived in view of such problems of the prior art, and an object of the present disclosure is to reduce swinging and vibration of the rotor.

The present disclosure has been proposed to achieve the foregoing object, and therefore an embodiment of the disclosure provides a vacuum pump provided with a magnetic bearing device, the vacuum pump including: radial magnetic force generation means for supporting a rotor for exhausting gas in a radial direction in a non-contact manner by using a magnetic force; and a radial displacement detection means for detecting displacement of the rotor in the radial direction, wherein two of the radial magnetic force generation means are provided on an outlet side with respect to a center of gravity of the rotor in an exhaust direction of the gas.

According to this configuration, when the rotor is displaced from an equilibrium point in the radial direction, a restoring force that is applied to a lower portion of the rotor by the radial magnetic force generation means and an inclination force generated according to the position of the rotor, are produced in the same direction. Thus, swinging and vibration of the rotor can be controlled efficiently without causing the inclination force to attenuate a parallel force acting on the lower portion of the rotor.

In some examples, a first radial magnetic force generation means disposed on an inlet side of the exhaust direction of the gas actively supports the rotor, and a second radial magnetic force generation means disposed on the outlet side of the exhaust direction of the gas passively supports the rotor.

According to this configuration, since the center of gravity of the rotor, the first radial magnetic force generation means, and the second radial magnetic force generation means are arranged in this order along the exhaust direction of the gas, when the rotor is displaced from the equilibrium point in the radial direction, a restoring force that is applied to the lower portion of the rotor by the second radial magnetic force generation means and an inclination force generated according to the position of the rotor, are produced in the same direction. Thus, swinging and vibration of the rotor can be controlled efficiently without causing the inclination force to attenuate the restoring force acting on the lower portion of the rotor.

In some examples, a center of the first radial magnetic force generation means and a center of the radial displacement detection means are arranged on the same plane.

According to this configuration, since a point where the radial displacement detection means detects displacement of the rotor from the equilibrium point matches a point where the first radial magnetic force generation means applies the restoring force to the rotor, swinging and vibration of the rotor can be controlled efficiently.

In some examples, the disclosure describes a magnetic bearing device used in any of the vacuum pumps described herein.

According to this configuration, when the rotor is displaced from the equilibrium point, the restoring force that is applied to the lower portion of the rotor by the radial magnetic force generation means and the inclination force generated according to the position of the rotor, are produced in the same direction. Thus, swinging and vibration of the rotor can be controlled efficiently.

In some examples, the disclosure describes a rotor used in any of the vacuum pumps described herein.

According to this configuration, when the rotor is displaced from the equilibrium point, the restorative force applied to the lower portion of the rotor by the radial magnetic force generation means and the inclination force generated according to the position of the rotor are produced in the same direction. Thus, wiggling and vibration of the rotor can be controlled efficiently.

According to the present disclosure, when the rotor is displaced from the equilibrium point, the restoring force that is applied to the lower portion of the rotor by the radial magnetic force generation means and the inclination force generated according to the position of the rotor are produced in the same direction. Thus, swinging and vibration of the rotor can be controlled efficiently without causing the inclination force to attenuate the restoring force acting on the lower portion of the rotor. In addition, since the restoring force acting on the lower portion of the rotor is not attenuated by the inclination force, the part accuracy of the rotor can be loosened up and the time required for fine adjustment in assembling the vacuum pump can be reduced.

DETAILED DESCRIPTION

In order to achieve the object for reducing swinging and vibration of the rotor, the present disclosure has realized a vacuum pump provided with a magnetic bearing device, the vacuum pump including: radial magnetic force generation means for supporting a rotor for exhausting gas in a radial direction in a non-contact manner by using a magnetic force; and a radial displacement detection means for detecting displacement of the rotor in the radial direction, wherein two of the radial magnetic force generation means are provided on the outlet side with respect to the center of gravity of the rotor in the exhaust direction of the gas.

Examples

Figure 1:
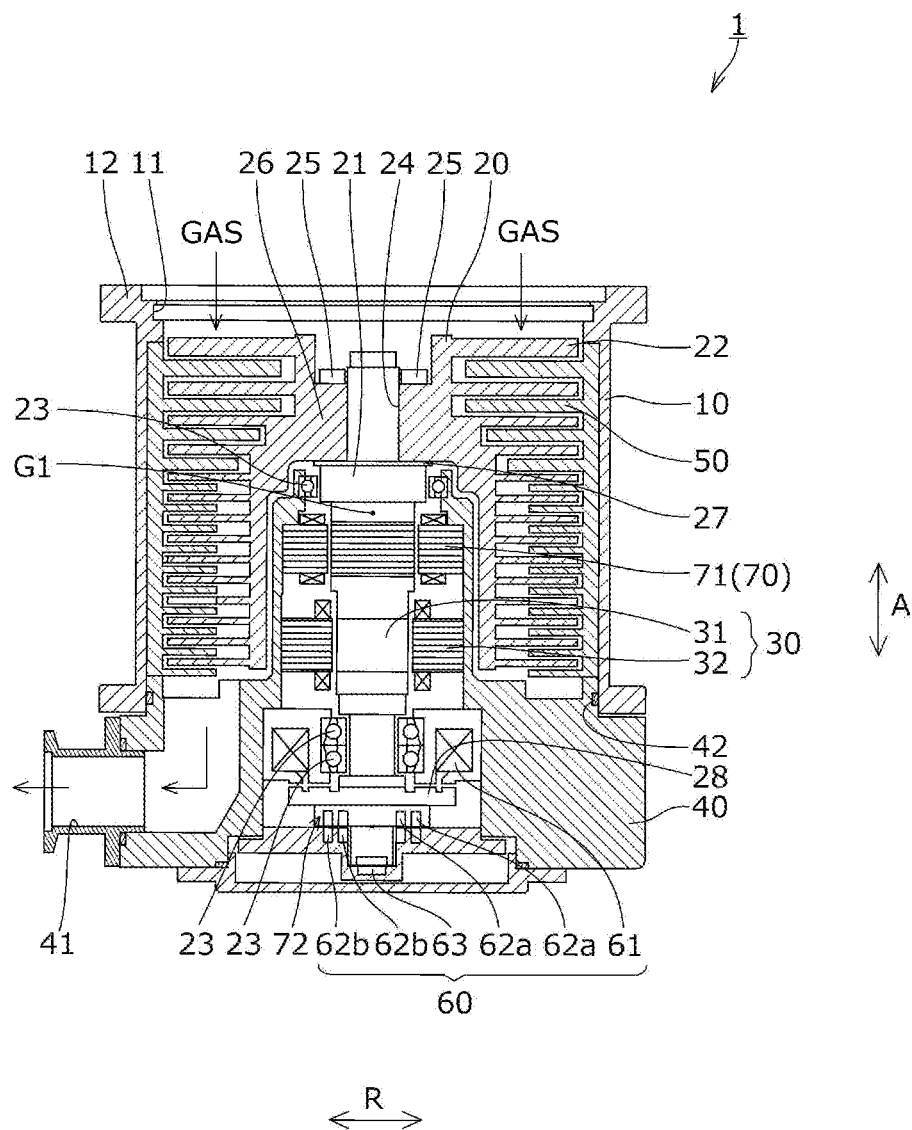
FIG. 1 is a vertical sectional view showing a vacuum pump according to a first embodiment of the present disclosure.
Figure 2:
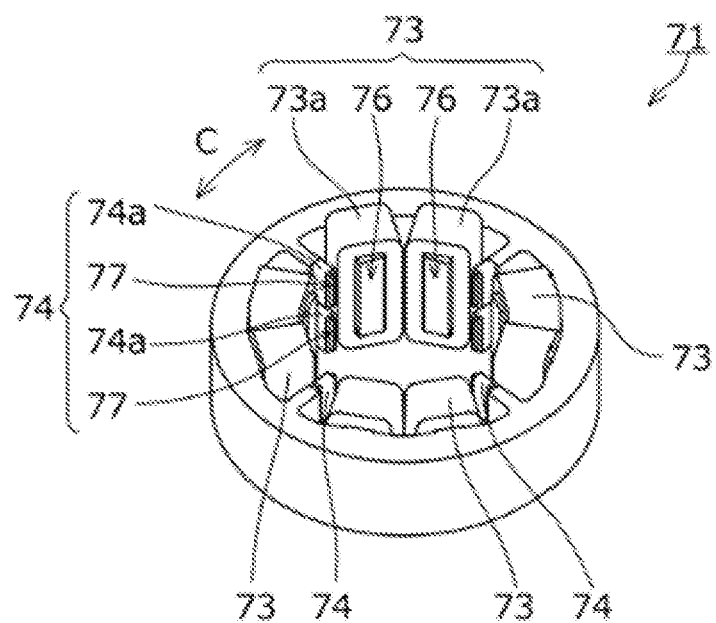
FIG. 2 is a perspective view showing an active radial bearing of FIG. 1.
Figure 3:
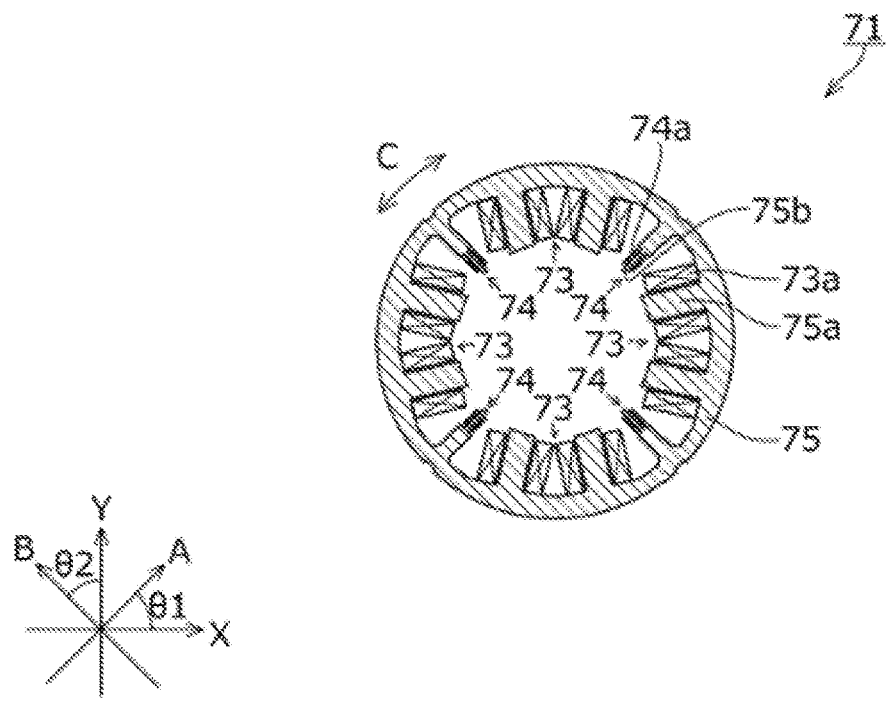
FIG. 3 is a cross-sectional view showing the active radial bearing of FIG. 2.

A vacuum pump 1 according to a first embodiment of the present disclosure is described hereinafter with reference to the drawings. Note, in the following description, that the terms "upper" and "lower" respectively refer to the upstream side and the downstream side of an exhaust direction of gas. That is, in an axial direction A described hereinafter, the inlet port 11 side is the top and the outlet port 41 side is the bottom. FIG. 1 is a vertical sectional view showing a structure of the vacuum pump 1 according to the first embodiment of the present disclosure. FIG. 2 is a perspective view showing an active radial bearing 71. FIG. 3 is a cross-sectional view showing the active radial bearing 71 of FIG. 2.

The vacuum pump 1 is a turbomolecular pump for exhausting gas in an external device such as a semiconductor manufacturing apparatus, a liquid crystal manufacturing apparatus, an electron microscope, a surface analyzer, or a microfabrication apparatus. The vacuum pump 1 is provided with a frame 10, a rotor 20 having a rotor shaft 21 rotatably supported in the frame 10, a drive motor 30 that rotates the rotor shaft 21, and a stator column 40 that accommodates a part of the rotor shaft 21 and the drive motor 30.

The frame 10 is formed into a cylindrical shape. The inlet port 11 is formed at an upper end of the frame 10. The frame 10 is mounted on a vacuum container such as a chamber of the external device, not shown, via an upper flange 12. The inlet port 11 is connected to the vacuum container. The frame 10 is placed on and fixed to the stator column 40.

The rotor 20 has the rotor shaft 21, and rotor blades 22 fixed to an upper portion of the rotor shaft 21 and arranged, that is, provided side by side, in a concentric manner with respect to a shaft center of the rotor shaft 21. In the present embodiment, 14 stages of rotor blades 22 are provided. Hereinafter, the axial direction of the rotor shaft 21 is referred to as "axial direction A", and the radial direction of the rotor shaft 21 is referred to as "radial direction R".

The rotor blades 22, formed of blades tilted at a predetermined angle, are formed integrally on an upper outer peripheral surface of the rotor 20. In addition, a plurality of the rotor blades 22 are installed radially around the axis of the rotor 20.

Upper and lower portions of the rotor shaft 21 are inserted into touchdown bearings 23. In a case where the rotor shaft 21 becomes uncontrollable, the rotor shaft 21 rotating at high speed comes into contact with the touchdown bearings 23, preventing the vacuum pump 1 from being damaged.

With the upper portion of the rotor shaft 21 inserted into a boss hole 24, the rotor 20 is integrally mounted on the rotor shaft 21 by inserting a bolt 25 into a rotor flange 26 and screwing the bolt 25 into a shaft flange 27.

The drive motor 30 has a rotor 31 mounted on an outer periphery of the rotor shaft 21, and a stator 32 disposed so as to surround the rotor 31. The stator 32 is connected to a control unit, not shown, and rotation of the rotor 20 is controlled by the control unit.

Stator blades 50 are provided between the rotor blades 22. Specifically, the rotor blades 22 and the stator blades 50 are arranged in multiple stages so as to alternate with each other along the axial direction A. In the present embodiment, 14 stages of the stator blades 50 are provided.

The stator blades 50 are each formed in an annular shape and each include a blade inclined in a direction opposite to the rotor blades 22, and a ring coupled to either end of the blade. In addition, the stator blades 50 are each positioned by being sandwiched, in the axial direction A, by spacers, not shown, which are installed on an inner peripheral surface of the frame 10 in a stacked manner. Furthermore, a plurality of the blades of the stator blades 50 are also installed radially around the axis of the rotor 20.

The length of the blades of the rotor blades 22 and the stator blades 50 are set in such a manner as to gradually become short from the upper side toward the lower side in the axial direction A.

The outlet port 41 is formed to a side of a lower portion of the stator column 40. The outlet port 41 is connected in a communicating manner to an auxiliary pump, not shown. The vacuum pump 1 is configured to transfer the gas sucked from the inlet port 11, from the upper side to the lower side in the axial direction A by means of the rotation of the rotor blades 22, and to exhaust the gas from the outlet port 41 to the outside. An O-ring 42 is interposed between the stator column 40 and the frame 10. Hereinafter, the direction in which the gas is exhausted is referred to as "gas exhaust direction".

The rotor shaft 21 is supported, in a non-contact manner, by an axial direction bearing 60 and a radial direction bearing 70.

The axial direction bearing 60 actively supports the rotor shaft 21 in the axial direction A. The axial direction bearing 60 has an axial electromagnet 61, permanent magnets 62a, 62b, and an axial sensor 63.

The axial electromagnet 61 is disposed so as to face an armature disc 28. The axial electromagnet 61 pulls up the armature disc 28 in such a manner as to draw the armature disc 28.

The permanent magnet 62a is an upper permanent magnet integrated with the armature disc 28, and the permanent magnet 62b is a lower permanent magnet integrated with the stator column 40. Therefore, the armature disc 28 pulled up by the axial electromagnet 61 is pulled down to an equilibrium point of the axial direction A by the attractive force between the permanent magnets 62a and 62b.

The radial direction bearing 70 has the active radial bearing 71 and a passive radial bearing 72. A center of gravity G1 of the rotor 20, the active radial bearing 71, and the passive radial bearing 72 are arranged in this order along the gas exhaust direction.

The active radial bearing 71 has four radial electromagnets 73 that support, in a non-contact manner, the rotor shaft 21 in the radial direction R using magnetic force, and four radial sensors 74 that detect displacement of the rotor shaft 21 in the radial direction R. Coils 73a of the radial electromagnets 73 and coils 74a of the radial sensors 74 are wrapped around the same core 75, that is, wound around the core 75.

The radial electromagnets 73 are arranged 90 degrees apart along a circumferential direction C of the core 75 and arranged on an X-axis or Y-axis. The radial electromagnets 73 each have a pair of magnetic poles 76 that is formed by wrapping the coil 73a around a protruding portion 75a of the core 75.

The pair of magnetic poles 76 has mutually different polarities by wrapping the coils 73a therearound in reverse directions. Furthermore, the coils 73a that are adjacent to each other with the radial sensor 74 therebetween are wrapped around the core 75 in the same direction so that the magnetic poles 76 that are adjacent to each other between the radial electromagnets 73 adjacent to each other in the circumferential direction C of the core 75, namely, the magnetic poles 76 adjacent to each other with the radial sensor 74 therebetween have the same polarity.

The radial sensors 74 are each disposed between the radial electromagnets 73 adjacent to each other in the circumferential direction C of the core 75. Each of the radial sensors 74 is disposed on an A-axis that is inclined by a predetermined angle θ1 with respect to the X-axis or a B-axis that is inclined by a predetermined angle θ2 with respect to the Y-axis. In the present embodiment, the predetermined angles θ1, θ2 are set at 45 degrees.

The radial sensors 74 each have a pair of upper and lower magnetic poles 77 that is formed by wrapping the coil 74a around a tab portion 75b of the core 75. The magnetic poles 77 in the pair have mutually different polarities by wrapping the coils 74a therearound in opposite directions.

The center of each radial electromagnet 73 and the center of each radial sensor 74 are set on the same plane so as to match when planarly viewed. Therefore, a point where the radial electromagnets 73 apply a restoring force to the upper portion of the rotor 20 matches a point where the radial sensors 74 detect displacement of the rotor 20 from the equilibrium point in the radial direction R.

Note that the radial sensors 74 may not only be an inductance-type displacement sensor in which the foregoing radial electromagnets 73 and the core 75 are integrated, but also a capacitive sensor made of a different member.

The passive radial bearing 72 passively supports the rotor shaft 21 in the radial direction R. Specifically, the passive radial bearing 72 is the permanent magnets 62a, 62b that are provided so as to face each other in the axial direction A. When the rotor shaft 21 is displaced from the equilibrium point of the radial direction R, a magnetic resistance between the permanent magnets 62a and 62b increases, thereby generating a restoring force that pulls the rotor shaft 21 back to the equilibrium point of the radial direction R.

When a printed circuit board (not shown) for connecting the coils 74a is installed on the active radial bearing 71, it is preferred that a conductive shield plate be interposed between the active radial bearing 71 and the printed circuit board. Accordingly, magnetic coupling between the radial electromagnets 73 and the radial sensors 74 is prevented.

The radial electromagnets 73 may be provided with a conductive shield ring which is made of copper or the like and mounted on the radial electromagnet 73. Accordingly, the shield ring narrows a magnetic flux of the radial electromagnets 73, thereby reducing magnetic coupling between the radial electromagnets 73 and the radial sensors 74.

The radial electromagnets 73 are also each provided with a conductive shield tube made of copper or the like, which is provided so as to cover an outer periphery of each of the coils 74a of the radial sensors 74. Accordingly, the shield tube narrows a magnetic flux of the radial sensors 74, thereby reducing magnetic coupling between the radial electromagnets 73 and the radial sensors 74. It is also preferred that a conductive electrostatic shield plate formed in a ring shape or a magnetic shield plate made of a magnetic material be interposed between the active radial bearing 71 and the motor stator 32. Accordingly, magnetic coupling between the active radial bearing 71 and the motor stator 32 is prevented.

The axial direction bearing 60 and the radial direction bearing 70 are connected to the control unit, not shown. The control unit controls excitation currents of the axial electromagnet 61 and of the radial electromagnets 73 on the basis of detection values of the axial sensor 63 and the radial sensors 74, so that the rotor shaft 21 is supported so as to be positioned at the equilibrium points of the axial direction A and the radial direction R.

Figure 4:
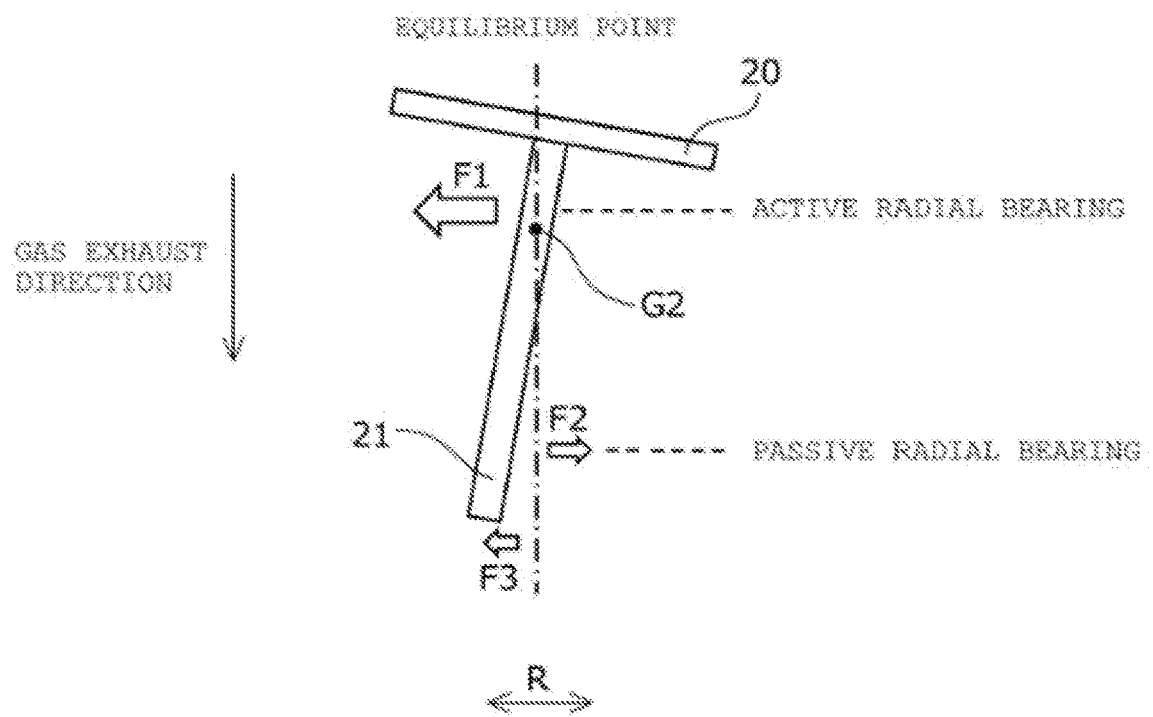
FIG. 4 is a diagram schematically showing how a rotor is pulled back to an equilibrium point in a vacuum pump according to a comparative embodiment.

Operations of the radial direction bearing 70 are described next with reference to the drawings. FIG. 4 is a diagram schematically showing how the rotor is pulled back to the equilibrium point in a vacuum pump according to a comparative embodiment.

In the vacuum pump according to the comparative embodiment, the active radial bearing 71 is disposed on the upper side of axial direction A and the passive radial bearing 72 is disposed on the lower side of the axial direction A, with a center of gravity G2 of the rotor 20 sandwiched therebetween.

The upper portion of the rotor 20 is actively supported by the active radial bearing 71. Therefore, in a case where the rotor 20 swings from the equilibrium point in the radial direction R, the radial electromagnets 73 apply an upper restoring force F1 to the rotor 20 to pull the rotor 20 back to the equilibrium point.

Figure 5:
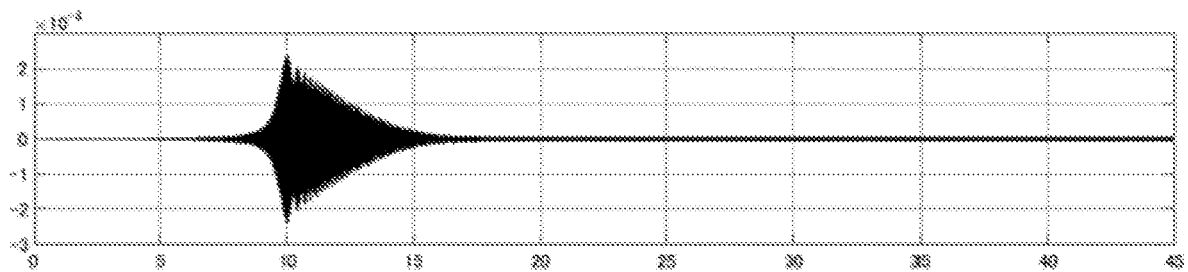
FIG. 5 is a graph showing a transition of vibration of the rotor in the vacuum pump according to the comparative embodiment.

On the other hand, the lower portion of the rotor 20 is passively supported by the passive radial bearing 72. Therefore, in a case where the rotor 20 swings from the equilibrium point in the radial direction R, a lower restoring force F2 caused by the magnetic resistance of the permanent magnets 62a, 62b and an inclination force F3 caused by the inclination of the rotor 20 are applied to the lower portion of the rotor 20. However, since the lower restoring force F2 and the inclination force F3 act on the rotor 20 in opposite directions, the lower restoring force F2 is attenuated by the amount of the inclination force F3, causing the swinging or vibration of the rotor 20 to persist for a long period of time, as shown in FIG. 5 (horizontal axis: time [seconds], vertical axis: amplitude [mm]).

Figure 6:
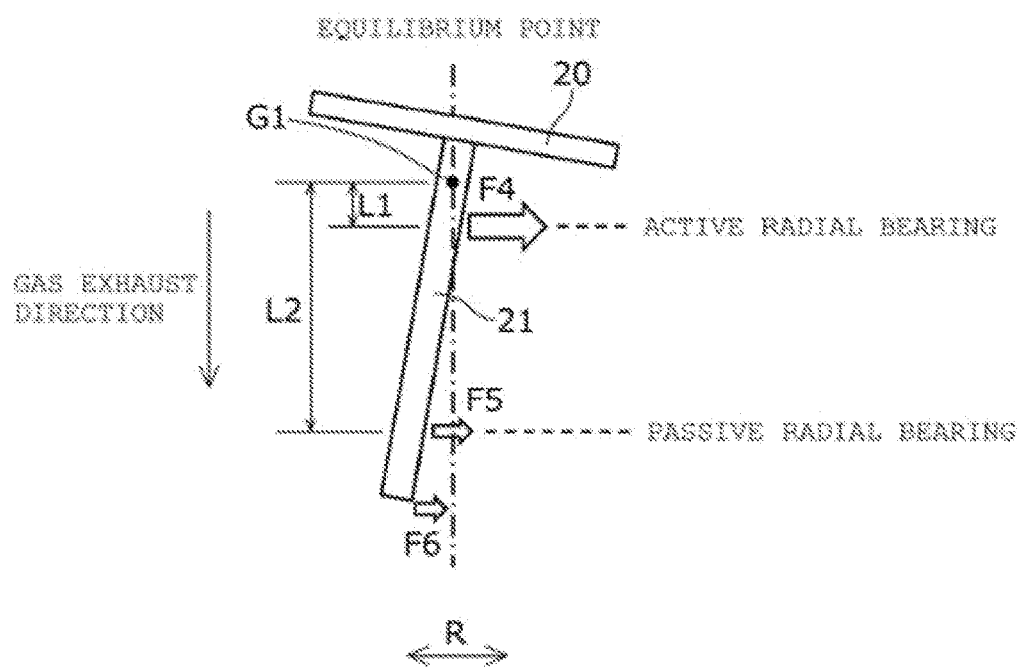
FIG. 6 is a diagram schematically showing how the rotor is pulled back to the equilibrium point in the vacuum pump shown in FIG. 1.
Figure 7:
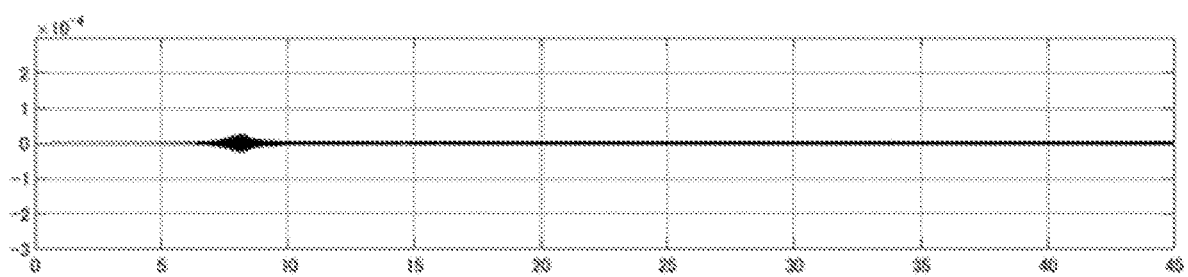
FIG. 7 is a graph showing a transition of vibration of the rotor in the vacuum pump shown in FIG. 1.

FIG. 6 is a diagram schematically showing how the rotor 20 is pulled back to the equilibrium point in the vacuum pump 1. In the vacuum pump 1 according to the present embodiment, the active radial bearing 71 that actively supports the rotor 20 is disposed below the center of gravity G1 of the rotor 20. Therefore, in a case where the rotor 20 swings from the equilibrium point in the radial direction R, the radial electromagnets 73 apply an upper restoring force F4 to the upper portion of the rotor 20 to pull the rotor 20 back to the equilibrium, and a lower restoring force F5 caused by the magnetic resistance of the permanent magnets 62a, 62b and an inclination force F6 caused by the inclination of the rotor 20 are applied to the lower portion of the rotor 20, in the same direction with respect to the rotor 20, thereby efficiently controlling the swinging and vibration of the rotor 20. Thus, in the vacuum pump 1, swinging and vibration of the rotor 20 can be settled in a short period of time, as shown in FIG. 7 (horizontal axis: time [seconds], vertical axis: amplitude [mm]).

It is preferred that a distance L1 from the center of gravity G1 to the active radial bearing 71 and a distance L2 from the center of gravity G1 to the passive radial bearing 72 be set at L1:L2=1:4 to 20. When L2 is >20×L1, it means that the active radial bearing 71 is too close to the center of gravity G1, making it difficult for the active radial bearing 71 to control the lower restoring force. On the other hand, when L2 is <4×L1, the permanent magnets 62a, 62b need to be enlarged in order to increase the magnetic force between the permanent magnets 62a and 62b.

Figure 8:
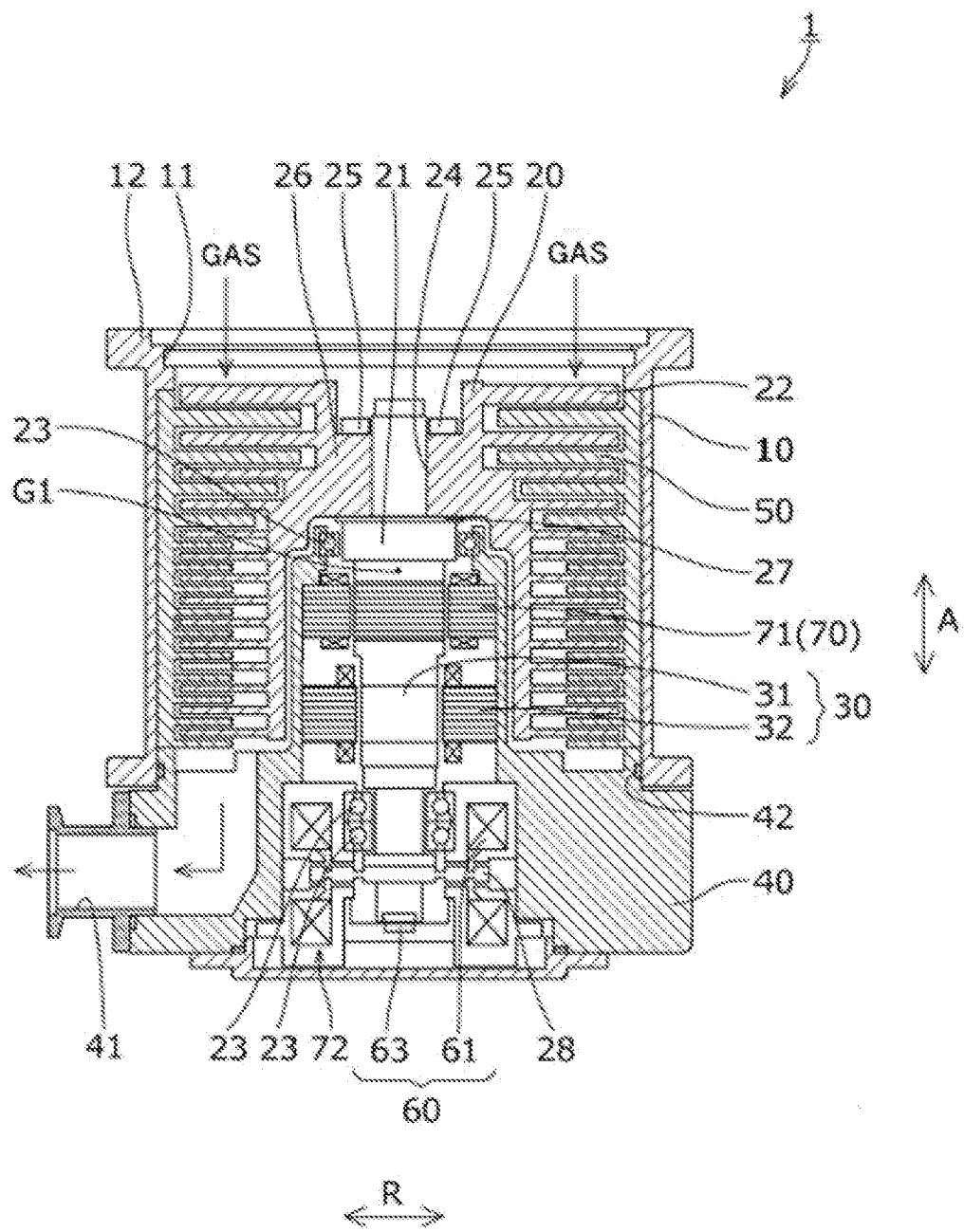
FIG. 8 is a vertical sectional view showing a vacuum pump according to a second embodiment of the present disclosure.

The vacuum pump 1 according to a second embodiment of the present disclosure is described hereinafter with reference to FIG. 8. Note that the vacuum pump of the present embodiment and the vacuum pump described above are different in terms of the configuration of the passive radial bearing. The same reference numerals are used to describe the configurations shared by the vacuum pump of the present embodiment and the vacuum pump described above, and the redundant descriptions are omitted accordingly. FIG. 8 is a vertical sectional view showing a structure of the vacuum pump 1 according to the second embodiment of the present disclosure.

The passive radial bearing 72 of the vacuum pump 1 according to the second embodiment of the present disclosure is an electromagnet. The passive radial bearing 72 is disposed so as to face the axial electromagnet 61, with the armature disc 28 therebetween.

The axial electromagnet 61 is disposed on the upper side of the axial direction A and the passive radial bearing 72 formed of an electromagnet is disposed on the lower side of the axial direction A, with the armature disc 28 therebetween. According to this configuration, even when the excitation currents of these upper and lower electromagnets are reduced simultaneously, the armature disc 28 can be levitated at the same position.

By simultaneously reducing the excitation currents of the upper and lower electromagnets, a restraining force for holding the armature disc 28 at the equilibrium point is lowered. Thus, even when the armature disc 28 vibrates, the vibration is not easily transmitted to the stator column 40 and the like, and consequently the vibration of the vacuum pump 1 can be reduced.

Moreover, since a permanent magnet that tends to become brittle by absorbing hydrogen gas is not used, the vacuum pump 1 used for exhausting hydrogen gas can be prevented from breaking down.

As described above, in the vacuum pump 1, when the rotor 20 is displaced from the equilibrium point in the radial direction R, the lower restoring force F5 of the passive radial bearing 72 that acts on the lower portion of the rotor 20 and the inclination force F6 caused by the position of the rotor 20 are generated in the same direction, efficiently controlling the swinging and vibration of the rotor 20.

Furthermore, since swinging and vibration of the rotor 20 can efficiently be settled, the part accuracy can be loosened up and adjustment of the vacuum pump 1 can be performed in a short period of time.

The present disclosure can be applied to not only an inner rotor-type vacuum pump but also an outer rotor-type vacuum pump. Needless to say, the vacuum pump according to the present disclosure can be applied not only to an all-blade vacuum pump composed only of a turbomolecular pump, but also to a composite-type vacuum pump in which a turbomolecular pump and a thread groove pump are combined.

Various modifications can be made to the present disclosure without departing from the spirit of the present disclosure, and it goes without saying that the present disclosure extends to such modifications.

REFERENCE SIGNS LIST

1 Vacuum pump
10 Frame
11 Inlet port
12 Upper flange
20 Rotor
21 Rotor shaft
22 Rotor blade
23 Touchdown bearing
24 Boss hole
25 Bolt
26 Rotor flange
27 Shaft flange
28 Armature disc
30 Drive motor
31 Rotor
32 Stator
40 Stator column
41 Outlet port
42 O-ring
50 Stator blade
60 Axial direction bearing
61 Axial electromagnet
62a, 62b Permanent magnet
63 Axial sensor
70 Radial direction bearing 71 Active radial bearing (first radial magnetic force generation mean)
72 Passive radial bearing (second radial magnetic force generation mean)
73 Radial electromagnet
74 Radial sensor
75 Core
75a Protruding portion
75b Tab portion
76 Magnetic pole (of radial electromagnet)
77 Magnetic pole (of radial sensor)
G1 Center of gravity of rotor
A Axial direction
C Circumferential direction (of core)
R Radial direction

What is claimed is:

1. A vacuum pump provided with a magnetic bearing device, the vacuum pump comprising:
a plurality of radial magnetic force generation means for supporting a rotor for exhausting gas in a radial direction in a non-contact manner by using a magnetic force; and
a radial displacement detection means for detecting displacement of the rotor in the radial direction, wherein
two of the radial magnetic force generation means are provided on an outlet port side with respect to a center of gravity of the rotor in an exhaust direction of the gas,
the radial magnetic force generation means disposed on an inlet port side is controlled based on a detection value of the radial displacement detection means, and
the radial displacement detection means is provided on the outlet port side with respect to the center of gravity of the rotor in the exhaust direction of the gas.

2. The vacuum pump according to claim 1, wherein a first radial magnetic force generation means disposed on the inlet port side of the exhaust direction of the gas actively supports the rotor, and a second radial magnetic force generation means disposed on the outlet port side of the exhaust direction of the gas passively supports the rotor.

3. The vacuum pump according to claim 2, wherein a center of the first radial magnetic force generation means and a center of the radial displacement detection means are arranged on the same plane across an axis of the rotor.

4. A magnetic bearing device for use in a vacuum pump, the magnetic bearing device comprising:
a plurality of radial magnetic force generation means for supporting a rotor for exhausting gas in a radial direction in a non-contact manner by using a magnetic force; and
a radial displacement detection means for detecting displacement of the rotor in the radial direction, wherein
two of the radial magnetic force generation means are provided on an outlet port side with respect to a center of gravity of the rotor in an exhaust direction of the gas,
the radial magnetic force generation means disposed on an inlet port side is controlled based on a detection value of the radial displacement detection means, and
the radial displacement detection means is provided on the outlet port side with respect to the center of gravity of the rotor in the exhaust direction of the gas.

5. A rotor for use in a vacuum pump, the vacuum pump comprising
a plurality of radial magnetic force generation means for supporting a rotor for exhausting gas in a radial direction in a non-contact manner by using a magnetic force; and
a radial displacement detection means for detecting displacement of the rotor in the radial direction, wherein
the rotor has a center of gravity located on an inlet port side with respect to two of the radial magnetic force generation means in an exhaust direction of the gas,
the radial magnetic force generation means disposed on the inlet port side is controlled based on a detection value of the radial displacement detection means, and
the radial displacement detection means is provided on an outlet port side with respect to the center of gravity of the rotor in the exhaust direction of the gas.

6. The magnetic bearing device according to claim 4, wherein a first radial magnetic force generation means disposed on the inlet port side of the exhaust direction of the gas actively supports the rotor, and a second radial magnetic force generation means disposed on the outlet port side of the exhaust direction of the gas passively supports the rotor.

7. The magnetic bearing device according to claim 6, wherein a center of the first radial magnetic force generation means and a center of the radial displacement detection means are arranged on the same plane across an axis of the rotor.

8. The rotor according to claim 5, wherein a first radial magnetic force generation means disposed on the inlet port side of the exhaust direction of the gas actively supports the rotor, and a second radial magnetic force generation means disposed on the outlet port side of the exhaust direction of the gas passively supports the rotor.

9. The rotor according to claim 8, wherein a center of the first radial magnetic force generation means and a center of the radial displacement detection means are arranged on the same plane across an axis of the rotor.

* * * * *